United States Patent [19]
Koizumi et al.

[11] Patent Number: 5,641,554
[45] Date of Patent: Jun. 24, 1997

[54] COVER PAD FOR AIR BAG DEVICE

[75] Inventors: Junji Koizumi; Tsugunori Sugiura; Tadashi Yamamoto, all of Aichi, Japan

[73] Assignee: Toyoda Gosei Co., Ltd., Aichi, Japan

[21] Appl. No.: 422,832

[22] Filed: Apr. 17, 1995

[30] Foreign Application Priority Data

Apr. 18, 1994 [JP] Japan .................................. 6-078395

[51] Int. Cl.⁶ .................................. B60R 21/16
[52] U.S. Cl. .......................... 428/131; 428/43; 428/156; 428/134; 428/163; 525/331.7; 525/331.9; 525/333.1; 525/333.3; 280/728.3
[58] Field of Search ........................ 428/43, 131, 156, 428/134, 163; 525/331.7, 331.9, 333.1, 333.3; 280/728.3

[56] References Cited

U.S. PATENT DOCUMENTS

| | | | |
|---|---|---|---|
| 5,110,647 | 5/1992 | Sawada et al. | 428/43 |
| 5,158,322 | 10/1992 | Sun | 280/732 |
| 5,376,461 | 12/1994 | Shiraki et al. | 428/35.2 |

FOREIGN PATENT DOCUMENTS

| | | |
|---|---|---|
| 0588176 | 3/1994 | European Pat. Off. . |
| 4-314648 | 11/1992 | Japan . |
| 5-38996 | 2/1993 | Japan . |
| 2228235 | 8/1990 | United Kingdom . |
| 2250295 | 6/1992 | United Kingdom . |
| 2254618 | 10/1992 | United Kingdom . |

*Primary Examiner*—William Watkins
*Attorney, Agent, or Firm*—Cushman Darby & Cushman IP Group of Pillsbury Madison & Sutro LLP

[57] ABSTRACT

A cover pad for an air bag device, a main body of which is molded into a single layer using a resin/elastomer blend. The resin/elastomer blend is made by blending PP with an elastomer in a ratio ranging from 60/40 to 40/60 by weight. The elastomer is made by blending an EPM with a styrene-containing thermoplastic elastomer in a ratio ranging from 80/20 to 20/80 by weight. In addition, copolymerization of the EPM produces a propylene content ranging from 21 to 40 mol %; 3 mol % $\leq$ P-P $\leq$ 12 mol %; and 35 mol % $\leq$ E-P $\leq$ 50 mol % (where P-P is the dyad chain configuration ($^{13}$C-NMR) of the propylene-propylene bond; and E-P is the dyad chain configuration ($^{13}$C-NMR) of the ethylene-propylene bond).

10 Claims, 2 Drawing Sheets

COVER PAD FOR AIR BAG DEVICE

FIELD OF THE INVENTION

The present invention relates to an improved cover for use with various types of vehicle air bags.

BACKGROUND OF THE INVENTION

The invention relates to a pad for covering the upper surface of an air bag device that is installed to the steering wheel, the instrument panel in front of the assistant driver's seat of an automobile and the side door against the side collision. More particularly, the invention is directed to a pad for an air bag device, which is a highly productive single-layered molded body made of a thermoplastic elastomer (hereinafter referred to as "TPE").

Acronyms of major polymers used herein are listed below.

TPE . . . Thermoplastic elastomer

PP . . . Polypropylene

EPM . . . Amorphus ethylene-propylene random copolymer

TPS . . . Styrene-containing TPE

H-SBR . . . Hydrogenated styrene-butadiene copolymer

SEBS . . . Styrene-ethylene-butylene-styrene block copolymer

SEPS . . . Styrene-ethylene-propylene-styrene block copolymer

Conventionally, pads for covering air bag devices have usually been manufactured from polyurethane foams using reactive injection molding (RIM) techniques, with the foam being injection-molded with a net insert embedded therein. The net insert serves to reinforce the upper wall portion of the pad when the air bag is operated.

This conventional method, however, suffered from problems including: (1) the use of the net insert requires the net insert be set in the mold, which in turn increases the number of manufacturing steps; and (2) since polyurethanes used in RIM are thermosetting, the material cannot be reused To overcome these problems, a pad for an air bag device molded in a single layer using a resin/elastomer blend was proposed, e.g., in Unexamined Japanese Patent Publication Nos. Hei. 4-314648 and Hei. 5-38996 Olefin resins and stylene elastomer were suggested therein as the resin and the elastomer.

However, the thus constructed pads are made soft considering the fact that the material becomes brittle at a low temperature (usually at −40° C.).

As a result, not only the decorative part is easy to become sticky, but also abrasion resistance as well as weatherability are not sufficient, thus making it necessary to paint the decorative part before installation in an automobile.

SUMMARY OF THE INVENTION

The present invention was developed following consideration of the aforementioned problems. Accordingly, the object of the invention is to provide a pad for an air bag device which can be installed to an automobile without painting the decorative portion.

A pad for an air bag device of the invention overcomes the aforementioned problems by the following construction.

The pad serves to cover the upper surface of the air bag device. The main body of the pad is molded into a single layer using a resin/elastomer blend, and the pad has an opening structure that allows an upper wall portion thereof to be opened by breaking upon inflation of the enclosed air bag.

In such a pad for an air bag device, the resin/elastomer blend is made by blending polypropylene with an elastomer in a ratio ranging from 60/40 to 40/60 by weight. The elastomer is made by blending an ethylene-propylene random copolymer (EPM) with a styrene-containing thermoplastic elastomer (TPS) in a ratio ranging from 80/20 to 20/80 by weight; and copolymerization of the EPM satisfies: a propylene content ranging from 21 to 40 mol %; 3 mol % $\leq$ P-P $\leq$ 12 mol %; and 35 mol % $\leq$ E-P $\leq$ 50 mol % (where P-P is the dyad chain configuration ($^{13}$C-NMR) of the propylene-propylene bond; and E-P is the dyad chain configuration ($^{13}$C-NMR) of the ethylene-propylene bond).

BRIEF DESCRIPTION OF THE DRAWINGS

The invention will be disclosed in detail with reference to the following drawings wherein.

DETAILED DESCRIPTION OF PREFERRED EMBODIMENTS

An embodiment of the invention will now be described with reference to the drawings. The data about Comparative Examples are shown in Table 2.

Figure 2:
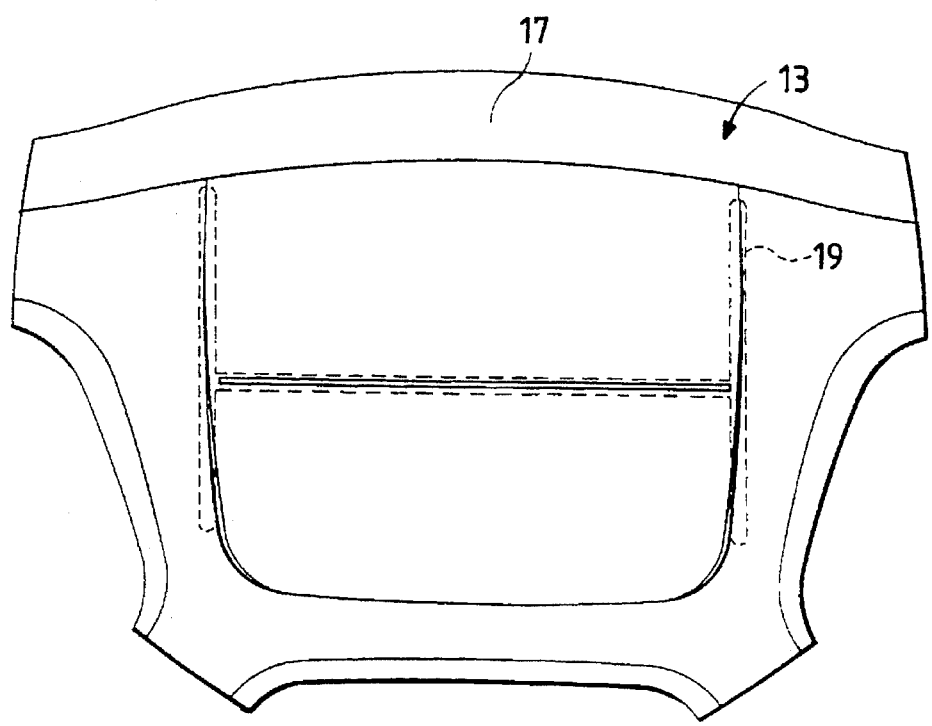
FIG. 2 is a plan view of the pad shown in FIG. 1.

The basic construction of- the pad 10, which is one embodiment of the invention, covers the upper surface of an air bag device 11. Pad 10 includes a main body 13 formed by molding a resin/elastomer blend into a single layer. An opening groove 19 is also provided in the main body 13 that allows an upper wall potion 17 to be opened by breaking upon inflation of an air bag 15. The opening groove 19 can have a variety of shapes but is usually H-shaped as shown in FIG. 2. Such a pad construction has the following features.

(1) A first feature resides in that the resin/elastomer blend is made by blending polypropylene (PP) with an elastomer in a ratio ranging from 60/40 to 40/60 by weight (more preferably, from 55/45 to 45/55).

The PP used in the invention includes: a polypropylene homopolymer; a propylene -α-olefin copolymer, e.g., a propylene-ethylene block copolymer and a blend thereof. A crystalline propylene-ethylene block copolymer among the aforementioned PPs is preferred.

Excessive PP makes it hard to achieve not only softness to the pad main body, but also cold resistance (low temperature impact resistance) (see Comparative Examples 1, 6). In addition, excessive elastomer not only produces insufficient abrasion resistance, makes the pad sticky (see Comparative Example 7), and gives insufficient shape maintaining capability, but also decreases fluidity, which in turn makes it difficult to form the pad main body into a single layer by injection molding techniques.

(2) A second feature resides in that the elastomer is made by blending an ethylene-propylene random copolymer (EPM) with a TPS in a ratio ranging from 80/20 to 20/80 by weight (more preferably, from 30/70 to 70/30 ).

Like the elastomer, excessive EPM not only gives insufficient abrasion resistance, but also makes the pad sticky (see Comparative Example 2). On the other hand, excessive TPS makes it difficult to achieve cold resistance (low temperature impact resistance) (see Comparative Example 3).

With respect to the TPS, the respective soft segments may be made of SBSs, which are polybutadienes, and SISs, which are isoprenes. Those having no double bond between molecules, such as SEBSs, SEPSs, and in addition hydrogenated SBRs and the like, that is to say, hydrogenated TPSs, provide excellent weather resistance, wear resistance, heat tolerability, and the like, and are therefore desirable.

(3) A third feature resides in that polymerization of the EPM leads to a polypropylene content is 21 to 40 mol % (more preferably, 23 to 35 mol %), 3 mol %≦P-P≦12 mol % (more preferably, 6 mol %≦P-P≦10 mol %); and 35 mol %≦E-P≦50 mol % (more preferably, 38 mol %≦E-P≦45 mol %) (where P-P is the dyad chain configuration ($^{13}$C-NMR) of the propylene-propylene bond; and E-P is the dyad chain configuration ($^{13}$C-NMR) of the ethylene-propylene bond).

When the polypropylene content of the EPM is within the aforementioned range, low-temperature properties are improved significantly despite the fact that the compound material has high hardness, and therefore does not address problems in inflation tests carried out at −40° C.

When the EPM is out of the aforementioned range, it is hard to obtain cold resistance (low-temperature impact resistance) (see Comparative Example 4, 5). In addition, if the PP content exceeds 40 mol %, pelletization becomes difficult. The method of manufacturing the aforementioned pad is not particularly limited and the following is an exemplary method.

The aforementioned resin/elastomer blend (PP/TPS/EPM compound) is charged into a mold as a molding material and is injection-molded. It should be noted that the molded product directly becomes a finished product without applying a weather-resistance paint to the surface of the pad as a finishing step.

The pad 13 is assembled by being fixed to an inflator 25 through retainers 27, the inflator 25 being disposed on a boss (not shown) of a steering wheel or similar retainer with the air bag 15 assembled thereto.

The pad 10 for an air bag device of the invention not only uses PP as the resin and the TPS/EPM blend as the elastomer in the resin/elastomer blend, but also uses a specifically copolymerized EPM so that the pad has a single layered structure. As a result of this construction, the pad has the following mode of operation and effect.

As shown in some exemplary tests (to be described below), the pad for an air bag device of the invention, which is a single-layered molded product, not only exhibits sufficient abrasion resistance, without giving finish painting, it is not sticky at the decorative part thereof, and also has such cold resistance so as to not disturb opening even when the air bag inflates and the pad opens at low temperatures.

Therefore, the pad for an air bag device of the invention can be not only installed to an automobile without painting the decorative part thereof, but also manufactured on a mass production basis because of the single-layered structure.

The exemplary tests carried out to verify the effect of the invention will be described below.

Pads, including both examples and comparative examples, were molded using the compounds shown in Tables 1 and 2. The specifications of the respective EPMs are as shown in Table 3. The specifications of the respective TPSs are as shown below.

TPS1 ... SEBS having a styrene content of 29 wt % and a melt viscosity of 500 cPs (in a 20% aqueous solution of toluene at 25° C.)

TPS2 ... SEBS having a styrene content of 13 wt % and a melt flow rate (MFR) (200° C.×5 kg) of 8 g/10 minutes TPS3 ... H-SBR having a styrene content of 10 wt % and a MFR (230° C.×2.16 kg) of 3.5 g/10 minutes TPS4 ... H-SBR having a styrene content of 30 wt % and a MFR (230° C.×2.16 kg) of 5.3 g/10 minutes TPS5 ... H-SEPS having a styrene content of 30 wt % and a MFR (230° C.×2.16 kg) of 0.7 g/10 minutes The specifications of the pads includes an average thickness of the upper wall portion of 3 mm with the remaining thickness of the opening groove being 0.8 mm.

The following performance tests were carried out on the respective pads. It should be noted that abrasion resistance and stickiness were subjected to sensory inspection by five subjects (adult men).

(i) Abrasion resistance

The surfaces of products were scratched by a surface abrasion test machine ("HEIDON" manufactured by Shinto Kagakusha) and abraded surface conditions were visibly inspected in accordance with the following criteria.

Not visible (4 or more out of 5 men) ... ○

Visible (4 or more out of 5 men) ... ×

Some judged visible and others invisible ... Δ

(ii) Stickiness

The surfaces of the pads were inspected by touching in accordance with the following criteria.

Not sticky (4 or more out of 5 men) ... ○

Sticky (4 or more out of 5 men) ... ×

Some judged sticky and others not sticky ... Δ

(iii) Inflation test (cold resistance)

The inflation test was carried out at a low temperature, in an atmosphere of −40° C., by assembling the pads to an air bag device similar to one actually installable to an automobile, and how the pads were opened was visibly judged in accordance with the following criteria.

Neatly opened ... ○

Pad was scattered ... ×

Part of Pad cracked ... Δ

The results of this test are shown in the tables. The performance of the respective Examples exhibited no problems in any of the abrasion resistance, stickiness, and inflation tests, whereas the respective Comparative Examples did exhibit problems in these tests.

It should be noted that Tables 1 and 2 show physical properties of the respective materials for reference. These physical properties were obtained by giving some preparations to the test pieces and making measurements.

The methods of measuring the physical property data are as follows.

(1) Hardness (JIS A), tensile strength ($T_B$), tensile elongation ($E_B$), low-temperature tensile strength (−35° C.), and high-temperature tensile strength (+85° C.) tests were carried out in accordance with JIS K 6301.

(2) Tan δ peak temperature was obtained from temperature dependence of the viscoelasticities (E', E") measured under a static distortion of 100 g, a dynamic distortion of 100 g (constant load), and a frequency of 20 Hz using "DVE-V4" manufactured by Rheology, Inc.

Figure 1:
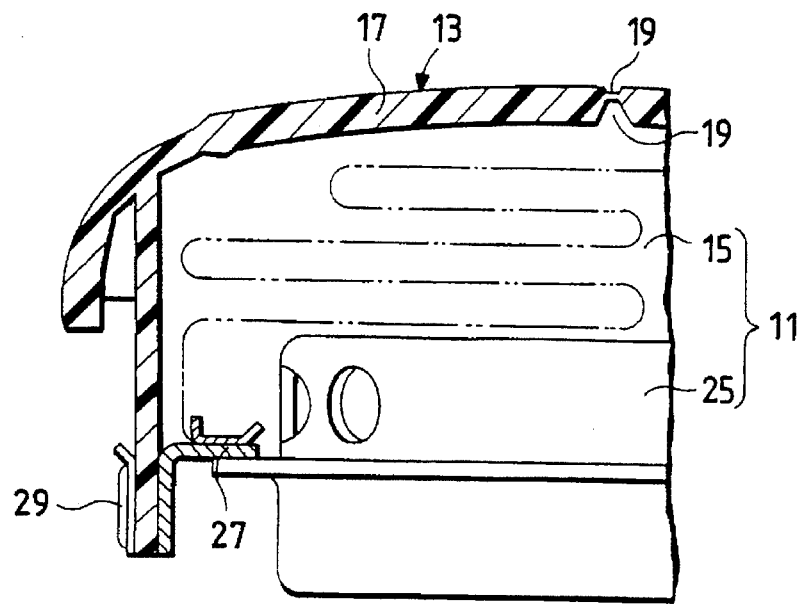
FIG. 1 is a half longitudinal sectional view showing how a pad, which is an embodiment of the invention, is attached to an air bag device.

The invention is not limited to the embodiment shown in FIGS. 1 and 2 with another exemplary embodiment described with reference to FIG. 3.

Figure 3:
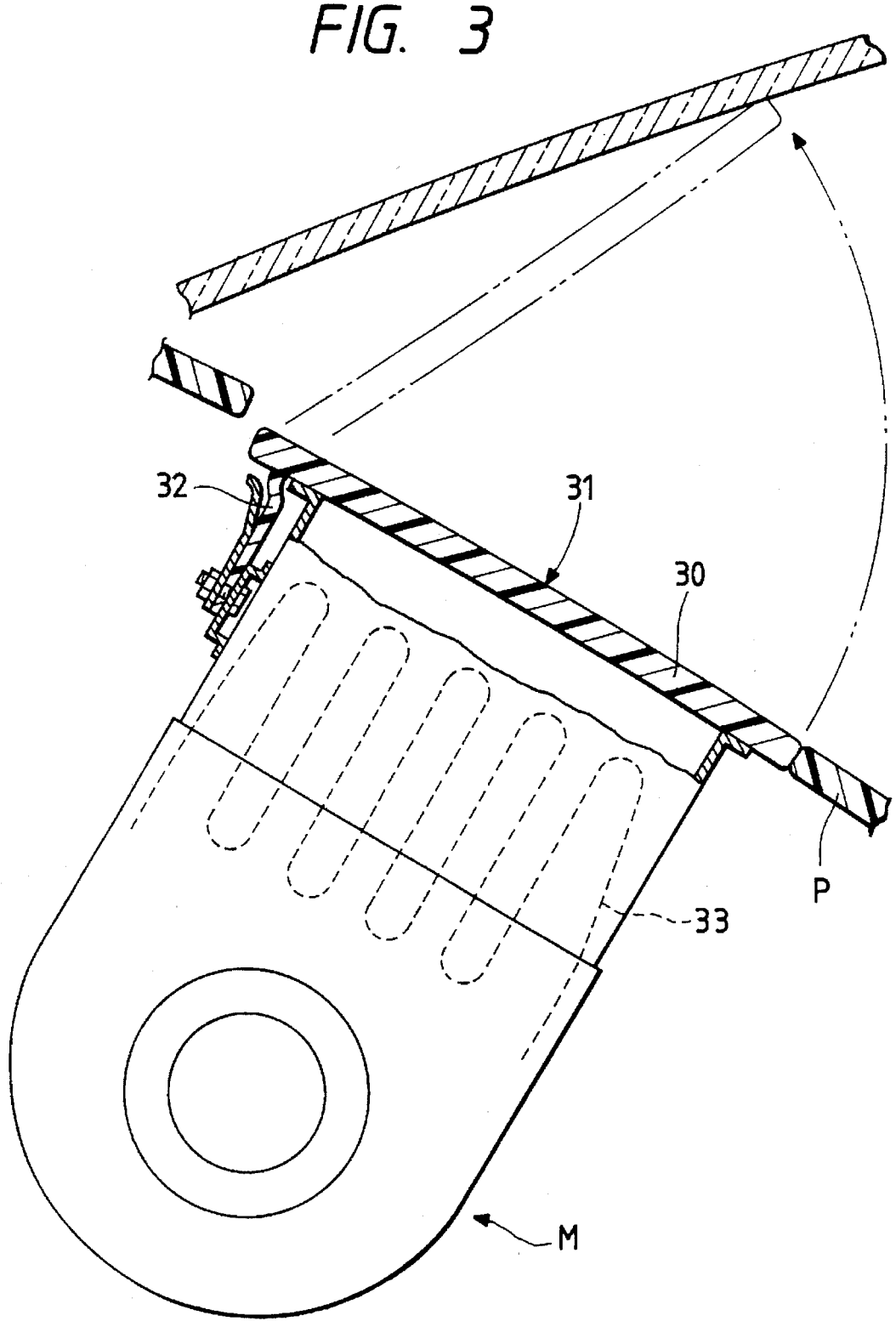
FIG. 3 is a cross-sectional view showing an air bag device installed to an installed to an instrument panel.

The embodiment shown in FIG. 3 relates to an air bag device M that is installed to an instrument panel P in front of the passenger's seat. The pad 30 includes a main body 31 and an attachment piece portion 32. In this embodiment, the pad 30 is opened for allowing the attachment piece portion 32 to be bent upon inflation of an air bag 33. By applying the present application to this embodiment, the same effect as described above is provided.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the appended claims.

TABLE 1

| | Examples | | | | | | | | | | |
|---|---|---|---|---|---|---|---|---|---|---|---|
| | 1 | 2 | 3 | 4 | 5 | 6 | 7 | 8 | 9 | 10 | 11 |
| PP | 50 | 50 | 50 | 55 | 40 | 50 | 50 | 50 | 50 | 50 | 45 |
| EPM1 | 40 | 30 | 15 | 30 | 30 | 30 | 30 | 30 | 30 | | |
| EMP2 | | | | | | | | | | | |
| EMP3 | | | | | | | | | | | |
| EMP4 | | | | | | | | | | | 30 | 33 |
| TPS1 | 10 | 20 | 35 | 15 | 30 | | | | | 20 | 22 |
| TPS2 | | | | | | 20 | | | | | |
| TPS3 | | | | | | | 20 | | | | |
| TPS4 | | | | | | | | 20 | | | |
| TPS5 | | | | | | | | | 20 | | |
| Hardness (JIS A) | 95 | 96 | 97 | 96 | 94 | 95 | 94 | 96 | 95 | 96 | 95 |
| Tensile strength (MPa) | 8.4 | 10.5 | 16.0 | 18.6 | 10.3 | 11.7 | 9.2 | 10.8 | 12.0 | 10.9 | 11.8 |
| Tensile elongation (%) | 890 | 690 | 620 | 720 | 650 | 730 | 900 | 710 | 700 | 670 | 680 |
| tan δ peak temperature (°C.) | −50 | −49 | −45 | −48 | −47 | −48 | −48 | −46 | −47 | −49 | −49 |
| Low-temperature tensile strength (MPa) | 22.2 | 26.0 | 27.5 | 25.6 | 18.1 | 25.0 | 18.6 | 23.5 | 25.4 | 24.8 | 27.5 |
| High-temperature tensile strength (MPa) | 4.5 | 5.6 | 6.1 | 4.6 | 4.3 | 3.5 | 3.9 | 5.8 | 5.3 | 5.7 | 4.5 |
| Abrasion resistance | ◯ | ◯ | ◯ | ◯ | ◯ | ◯ | ◯ | ◯ | ◯ | ◯ | ◯ |
| Stickiness | ◯ | ◯ | ◯ | ◯ | ◯ | ◯ | ◯ | ◯ | ◯ | ◯ | ◯ |
| Inflation test | ◯ | ◯ | ◯ | ◯ | ◯ | ◯ | ◯ | ◯ | ◯ | ◯ | ◯ |
| PP/elastomer ratio 60/40–40/60 | 50/50 | 50/50 | 50/50 | 55/45 | 40/60 | 50/50 | 50/50 | 50/50 | 50/50 | 50/50 | 45/55 |
| EPM/TPS = 80/20–20/80 | 80/20 | 60/40 | 30/70 | 66/34 | 50/50 | 60/40 | 60/40 | 60/40 | 60/40 | 60/40 | 60/40 |
| Bending modulus of elasticity (MPa) | 320 | 330 | 380 | 420 | 280 | 320 | 270 | 330 | 340 | 360 | 320 |

TABLE 2

| | Comparative examples | | | | | | |
|---|---|---|---|---|---|---|---|
| | 1 | 2 | 3 | 4 | 5 | 6 | 7 |
| PP | 100 | 40 | 40 | 50 | 50 | 62 | 30 |
| EPM1 | | 60 | | | | 19 | 40 |
| EMP2 | | | | 30 | | | |
| EMP3 | | | | | 30 | | |
| TPS1 | | | 60 | 20 | 20 | 19 | 30 |
| TPS2 | | | | | | | |
| TPS3 | | | | | | | |
| TPS4 | | | | | | | |
| TPS5 | | | | | | | |
| Hardness (JIS A) | 100 | 93 | 97 | 96 | 97 | 98 | 93 |
| Tensile strength (MPa) | 26.5 | 7.9 | 15.2 | 10.6 | 11.5 | 25.1 | 9.6 |
| Tensile elongation (%) | 200 | 630 | 600 | 670 | 660 | 650 | 910 |
| tan δ peak temperature (°C.) | 0 | −50 | −40 | −47 | −41 | −47 | −48 |
| Low-temperature tensile strength (MPa) | 59.2 | 13.3 | 33.0 | 31.9 | 30.8 | 31.0 | 14.5 |
| High-temperature tensile strength (MPa) | 14.8 | 2.5 | 5.8 | 5.4 | 5.7 | 5.6 | 2.1 |
| Abrasion resistance | X | X | ◯ | ◯ | ◯ | ◯ | X |
| Stickiness | ◯ | X | ◯ | ◯ | ◯ | ◯ | X |
| Inflation test | X | ◯ | X | X | X | X | ◯ |
| PP/elastomer ratio 60/40–40/60 | 100/0 | 40/60 | 40/60 | 50/50 | 50/50 | 62/38 | 30/70 |
| EPM/TPS = 80/20–20/80 | — | 100/0 | 0/100 | 60/40 | 60/40 | 50/50 | 57/43 |
| Bending modulus of elasticity (MPa) | 1000 | 210 | 310 | 340 | 350 | 510 | 150 |

TABLE 3

| EPM | Mooney Viscosity $ML_{1+4}$ 100° C. | Mooney Viscosity $ML_{1+4}$ 125° C. | PP content 25–35 mol % | Dyad chain configuration | |
|---|---|---|---|---|---|
| | | | | $4 \leq PP \leq 12$ mol % | $38 \leq EP \leq 50$ mol % |
| 1 | 76 | 50 | 29.3 | 8.5 | 41.6 |
| 2 | 24 | — | 19.4 | 2.1 | 34.7 |
| 3 | 15 | — | 17.6 | 1.7 | 31.8 |
| 4 | — | 19 | 29.3 | 7.9 | 42.9 |

What is claimed is:

1. A pad for an air bag device comprising:

a main body molded into a single layer of a resin/elastomer blend, an opening structure formed in said pad so that an upper wall portion of said main body can be opened by said opening structure upon inflation of an air bag, said resin/elastomer blend comprising polypropylene blended with an elastomer in a ratio ranging from 60/40 to 40/60 by weight, said elastomer comprising a blend of an ethylene-propylene random copolymer (EPM) together with a styrene-containing thermoplastic elastomer (TPS) in a ratio ranging from 80/20 to 20/80 by weight, and;

said EPM being copolymerized satisfies the following relationship: a propylene content ranging from 21 to 40 mol %; 3 mol % $\leq$ P-P $\leq$ 12 mol %; and 35 mol % $\leq$ E-P $\leq$ 50 mol % (where P-P is a dyad chain configuration ($^{13}$C-NMR) of propylene-propylene bond; and E-P is a dyad chain configuration ($^{13}$C-NMR) of ethylene-propylene bond).

2. A pad for an air bag device according to claim 1, wherein said opening structure includes a continuous opening groove.

3. A pad for an air bag device according to claim 1, wherein said resin/elastomer blend is made by blending polypropylene with elastomer in a ratio ranging from 55/45 to 45/55 by weight.

4. A pad for an air bag device according to claim 1, wherein said elastomer is made by blending said ethylene-propylene random copolymer (EPM) with styrene-containing thermoplastic elastomer (TPS) in a ratio ranging from 30/70 to 70/30 by weight.

5. A pad for an air bag device according to claim 1, wherein copolymerization of EPM results in a propylene content ranging from 23 to 35 mol %; 6 mol % $\leq$ P-P $\leq$ 10 mol %; and 38 mol % $\leq$ E-P $\leq$ 45 mol %.

6. A pad for an air bag device comprising:

a main body molded into a single layer of a resin/elastomer blend, an opening structure formed in said pad so that an upper wall portion of said main body can be opened by said opening structure upon inflation of an air bag, said resin/elastomer blend comprising polypropylene blended with an elastomer in a ratio ranging from 60/40 to 40/60 by weight, said elastomer comprising a blend of an ethylene-propylene random copolymer (EPM) together with a hydrogenated styrene-containing thermoplastic elastomer (hydrogenated TPS) in a ratio ranging from 80/20 to 20/80 by weight, and said EPM being copolymerized satisfies the following relationship a propylene content ranging from 21 to 40 mol %; 3 mol % $\leq$ P-P $\leq$ 12 mol %; and 35 mol % $\leq$ E-P $\leq$ 50 mol % (where P-P is a dyad chain configuration ($^{13}$C-NMR) of propylene-propylene bond; and E-P is a dyad chain configuration ($^{13}$C-NMR) of ethylene-propylene bond).

7. A pad for an air bag device according to claim 6, wherein said opening structure includes a continuous opening groove.

8. A pad for an air bag device according to claim 6, wherein said resin/elastomer blend is made by blending polypropylene with said elastomer in a ratio ranging from 55/45 to 45/55 by weight.

9. A pad for an air bag device according to claim 6, wherein elastomer is made by blending ethylene-propylene random copolymer (EPM) with hydrogenated TPS in a ratio ranging from 70/30 to 30/70 by weight.

10. A pad for an air bag device according to claim 6, wherein copolymerization of EPM results in a propylene content ranging from 23 to 35 mol %; 6 mol % $\leq$ P-P $\leq$ 10 mol %; and 38 mol % $\leq$ E-P $\leq$ 45 mol %.

* * * * *